(12) United States Patent
Ono et al.

(10) Patent No.: US 10,442,143 B2
(45) Date of Patent: Oct. 15, 2019

(54) MANUFACTURING METHOD FOR FIBRE-REINFORCED RESIN SUBSTRATE OR RESIN MOLDED ARTICLE

(71) Applicant: THE JAPAN STEEL WORKS, LTD., Tokyo (JP)

(72) Inventors: Akio Ono, Hiroshima (JP); Shoso Nishida, Hiroshima (JP); Hiroshi Ito, Hiroshima (JP); Takuya Niyama, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 516 days.

(21) Appl. No.: 14/762,070

(22) PCT Filed: Jan. 21, 2014

(86) PCT No.: PCT/JP2014/051138
§ 371 (c)(1),
(2) Date: Sep. 17, 2015

(87) PCT Pub. No.: WO2014/112644
PCT Pub. Date: Jul. 24, 2014

(65) Prior Publication Data
US 2016/0001510 A1 Jan. 7, 2016

(30) Foreign Application Priority Data
Jan. 21, 2013 (JP) ................................. 2013-008834

(51) Int. Cl.
*B29C 70/46* (2006.01)
*B29C 43/18* (2006.01)
(Continued)

(52) U.S. Cl.
CPC ............ *B29C 70/467* (2013.01); *B29C 43/18* (2013.01); *B29C 70/465* (2013.01);
(Continued)

(58) Field of Classification Search
None
See application file for complete search history.

(56) References Cited

U.S. PATENT DOCUMENTS 4,120,632 A * 10/1978 Stoeberl .............. B29C 33/0038
264/46.6
4,385,955 A 5/1983 Doerfling et al.
(Continued)

FOREIGN PATENT DOCUMENTS

DE 19955171 A1 5/2001
EP 0659541 A1 6/1995
(Continued)

OTHER PUBLICATIONS

Communication dated Jun. 30, 2016, issued by the State Intellectual Property Office of the People's Republic of China in counterpart Chinese Patent Application No. 201480005526.7.
(Continued)

*Primary Examiner* — Benjamin A Schiffman
(74) *Attorney, Agent, or Firm* — Sughrue Mion, PLLC (57) ABSTRACT

The present invention provides a method for manufacturing a fiber-reinforced resin substrate or a resin molded body, the method being capable of effectively performing impregnation of a reinforcing fiber material with a thermoplastic resin and having high productivity and economical efficiency, and an extruder for use in the manufacturing method. The manufacturing method of the invention is a method for manufacturing a fiber-reinforced resin substrate or resin molded body obtained by impregnating a reinforcing fiber material with a thermoplastic resin, including placing the reinforcing fiber material on a molten resin of the thermoplastic resin and pressurizing the same to impregnate the reinforcing fiber material with the molten thermoplastic resin, and subsequently, cooling and solidifying the rein-
(Continued)

forcing fiber material impregnated with the molten thermoplastic resin.

15 Claims, 3 Drawing Sheets

(51) Int. Cl.
| | |
|---|---|
| B29K 105/08 | (2006.01) |
| B29K 105/12 | (2006.01) |
| B29K 77/00 | (2006.01) |
| B29K 307/04 | (2006.01) |
| B29C 43/02 | (2006.01) |
| B29K 101/12 | (2006.01) |
| B29C 43/34 | (2006.01) |

(52) U.S. Cl.
CPC .......... *B29C 2043/023* (2013.01); *B29C 2043/3433* (2013.01); *B29K 2077/00* (2013.01); *B29K 2101/12* (2013.01); *B29K 2105/0854* (2013.01); *B29K 2105/12* (2013.01); *B29K 2307/04* (2013.01)

(56) References Cited

U.S. PATENT DOCUMENTS

| | | |
|---|---|---|
| 5,919,544 A | 7/1999 | Terajima |
| 6,004,122 A | 12/1999 | Terajima |
| 6,365,084 B1 | 4/2002 | Terajima |
| 2006/0220273 A1 | 10/2006 | Armstrong et al. |
| 2012/0038081 A1* | 2/2012 | Kendall .......... B29C 43/18 264/257 |
| 2013/0334734 A1* | 12/2013 | Takahashi ......... B29C 70/467 264/257 |

FOREIGN PATENT DOCUMENTS

| | | |
|---|---|---|
| GB | 2288145 A | 10/1995 |
| GB | 2465159 A | 5/2010 |
| JP | 62-103603 A | 5/1987 |
| JP | 3-274103 A | 12/1991 |
| JP | 5-338049 A | 12/1993 |
| JP | 6-328482 A | 11/1994 |
| JP | 6-339997 A | 12/1994 |
| JP | 7-195312 A | 8/1995 |
| JP | 9-136330 A | 5/1997 |
| JP | 2003-165851 A | 6/2003 |
| JP | 2005-319683 A | 11/2005 |
| JP | 2010-184497 A | 8/2010 |
| JP | 2011-143609 A | 7/2011 |
| JP | 2011-224866 A | 11/2011 |
| JP | 2012-016857 A | 1/2012 |
| JP | 2012-110935 A | 6/2012 |
| KR | 20-1985-0007461 U | 10/1985 |
| WO | 99/08852 A1 | 2/1999 |
| WO | 2011/100649 A1 | 8/2011 |
| WO | 2012/120628 A1 | 9/2012 |

OTHER PUBLICATIONS

International Search Report for PCT/JP2014/051138 dated May 13, 2014 [PCT/ISA/210].
Written Opinion for PCT/JP2014/051138 dated May 13, 2014 [PCT/ISA/237].
Communication dated May 11, 2016, issued by the Korean Intellectual Property Office in corresponding Korean Application No. 10-2015-7022663.
Communication dated Sep. 12, 2016, issued by the European Patent Office in counterpart European Patent Application No. 14741094.8.
Communication dated Jul. 27, 2018, by the European Patent Office in corresponding European Patent Application No. 14741094.8.

* cited by examiner

MANUFACTURING METHOD FOR FIBRE-REINFORCED RESIN SUBSTRATE OR RESIN MOLDED ARTICLE

TECHNICAL FIELD

The present invention relates to a method for manufacturing a fiber-reinforced resin substrate or resin molded body wherein a reinforcing fiber material is impregnated with a thermoplastic resin under pressure and a plasticization and injection unit for use in the manufacturing method.

BACKGROUND ART

Fiber-reinforced resins in which a resin is fiber-reinforced have light weight and high strength and have been used for various sporting goods, construction materials, aircraft, and the like and uses thereof have been extended to special automobile parts and the like, but the application thereof has not been advanced to general automobile parts where economical efficiency and mass productivity are regarded as important. However, with a change in social situations where the reduction of loads on the environment is required, the development of an automobile weight-reducing technology is becoming an important challenge and attention is being attracted to the application of the fiber-reinforced resins to the general automobile parts in which the use of a large amount of the resins is expected.

Of the fiber-reinforced resins, in consideration of mass production, easiness in handling and high productivity, applicability to various purposes, and the like, attention is focused on a fiber-reinforced resin in which a reinforcing fiber material such as a reinforcing fiber bundle or a reinforcing fiber woven fabric is impregnated with a thermoplastic resin. However, since a thermoplastic resin has high viscosity, it is not easy to impregnate the reinforcing fiber material therewith and there are problems that its homogeneous impregnation is difficult or air bubbles remain therein, so that various proposals have been made for solving such problems.

For example, PTL 1 proposes a method for manufacturing a sheet-like prepreg in which a pressure-reduced seal portion, a temperature-controllable connecting portion, and a die containing a molten resin stored therein are connected in tandem and a band-like reinforcing fiber bundle composed of a plurality of continuous reinforcing fibers is inserted from an introduction port at one end of the seal portion through the connection portion and the molten resin in the die and taken out of an end of the die. According to the manufacturing method, it is said that the impregnation with the resin is homogeneous and satisfactory and the impregnation time is short.

PTL 2 proposes a method for manufacturing a fiber-reinforced resin sheet by introducing a sheet-like reinforcing fiber substrate and a thermoplastic resin between a pair of rollers and impregnating the reinforcing fiber substrate with the thermoplastic resin in a molten state while rotating the pair of rolls, wherein a metal-made main roller and a metal-made press roller are used as the pair of rolls and the reinforcing fiber substrate is impregnated with the thermoplastic resin while the circumferential surface of the press roller is deformed so that the circumferential surface of the press roller conforms to the circumferential surface shape of the main roller by pressing the press roller against the main roller. According to the manufacturing method, since not a line pressure but a surface pressure can be applied to the thermoplastic resin for impregnation, it is said that homogeneous and satisfactory impregnation can be performed without uneven pressurization.

PTL 3 proposes a method for manufacturing a fiber-reinforced thermoplastic resin, the method comprising a disposing step of disposing a thermoplastic resin layer composed of a thermoplastic resin on one surface of a reinforcing fiber sheet constituted by a reinforcing fiber composed of a long fiber and disposing a net-like sheet composed of a material which does not melt at a temperature at which the thermoplastic resin melts, on another surface of the reinforcing fiber sheet to obtain a laminate and an impregnating step of heating and pressurizing the laminate at the temperature at which the thermoplastic resin melts but the net-like sheet does not melt to impregnate the reinforcing fiber sheet and the net-like sheet with the thermoplastic resin. According to the manufacturing method, since cavities can be reduced by thickening the thermoplastic resin layer and excessive thermoplastic resin can be transferred to the net-like sheet, it is said that there can be obtained a fiber-reinforced thermoplastic resin which has high fiber content and excellent strength, suppresses fiber meandering due to high resin content, and also has less cavities such as voids and satisfactory impregnation properties.

CITATION LIST

Patent Literature

PTL 1: JP-A-2012-16857
PTL 2: JP-A-2012-110935
PTL 3: JP-A-2011-224866

SUMMARY OF INVENTION

Technical Problem

Since the viscosity of a thermoplastic resin has temperature dependency, it is important to control temperature in the impregnation of a reinforcing fiber material with the thermoplastic resin. However, the temperature control alone is insufficient and vacuum or pressurization is utilized for accelerating the impregnation. In general, in consideration of equipment size, workability, and the like, the method of utilizing pressurization described in PTL 2 or 3 is superior to a method of utilizing vacuum like the manufacturing method proposed in PTL 1.

The method described in PTL 1 has a problem that it is limited to the manufacture of a resin substrate such as a strand or prepreg in which a reinforcing fiber is continuous in one direction and a resin molded body should be manufactured separately. In the manufacturing method proposed in PTL 2, although not a line pressure but a surface pressure can be applied to the thermoplastic resin for impregnation, the surface pressure is applied utilizing elastic deformation of the circumferential surface of the press roller and it is not easy to apply uniform surface pressure over a sufficient area. On the other hand, in the manufacturing method proposed in PTL 3, since pressurization is performed by means of a heating and pressurizing press or a double belt, it is possible to achieve uniform pressurization over a sufficient area. However, in the manufacturing method proposed in PTL 3, since the thermoplastic resin layer fed in a solid form should be first homogeneously melted, there is a problem in equipment and workability and since the net-like sheet is essential, there is a concern that the shape of a molded body may be limited.

In view of such conventional problems, an object of the present invention is to provide a method for manufacturing a fiber-reinforced resin substrate or resin molded body, the method being capable of effectively performing the impregnation of a reinforcing fiber material with a thermoplastic resin and having high productivity and economical efficiency, and a plasticization and injection unit for use in the manufacturing method.

Solution to Problem

A method for manufacturing a fiber-reinforced resin substrate or resin molded body according to the present invention is a method for manufacturing a fiber-reinforced resin substrate or resin molded body obtained by impregnating a reinforcing fiber material with a thermoplastic resin, comprising: placing the reinforcing fiber material on a molten resin of the thermoplastic resin; pressurizing the reinforcing fiber material to impregnate the reinforcing fiber material with the molten thermoplastic resin; and subsequently cooling and solidifying the reinforcing fiber material impregnated with the molten thermoplastic resin.

In the above-described invention, the molten resin of the thermoplastic resin may be a coated film. At the time of the pressurizing the reinforcing fiber material placed on the molten resin of the thermoplastic resin, the pressurization may be performed so that resin pressure is applied to a side portion of the reinforcing fiber material.

In a case of pressurizing the reinforcing fiber material, it may be performed through a pressurizing body on which a convex-concave portion or a groove for air vent has been provided.

The reinforcing fiber material may be formed by laminating the same kind or different kinds of materials. The reinforcing fiber material may be formed of carbon fiber.

The above-described fiber-reinforced resin substrate or resin molded body may preferably be manufactured by a plasticization and injection unit comprising: a receiving component for holding a molten resin of a thermoplastic resin; a pressurizing means for pressurizing a reinforcing fiber material through a pressurizing body on which a convex-concave portion or a groove for air vent has been provided; and a T-die for forming the molten resin.

In the above-described plasticization and injection unit, the pressurizing means may comprise a vacuum means that communicates with the uneven portion or groove portion for air vent in the pressurizing body. Further, the above-described plasticization and injection unit may comprise a heating means for heating the reinforcing fiber material.

Further, a method for manufacturing a fiber-reinforced resin substrate or resin molded body according to the present invention may be performed by: placing a reinforcing fiber material on a molten resin obtained from a thermoplastic resin containing a reinforcing fiber; pressurizing the reinforcing fiber material to impregnate the reinforcing fiber material with the molten thermoplastic resin; and subsequently cooling and solidifying the reinforcing fiber material impregnated with the molten thermoplastic resin, so that a fiber-reinforced resin substrate or resin molded body formed by lamination of layers each having a high fiber content can be manufactured.

Advantageous Effects of Invention

According to the present invention, it is possible to provide a method for manufacturing a fiber-reinforced resin substrate or resin molded body, the method being capable of effectively performing the impregnation of a reinforcing fiber material with a thermoplastic resin and having high productivity and economical efficiency, and a plasticization and injection unit for use in the manufacturing method.

BRIEF DESCRIPTION OF DRAWINGS

FIG. 3A shows a state before the movement of an upper mold, and FIG. 3B shows a state that an upper mold abuts on a lower mold.

DESCRIPTION OF EMBODIMENTS

Figure 1:
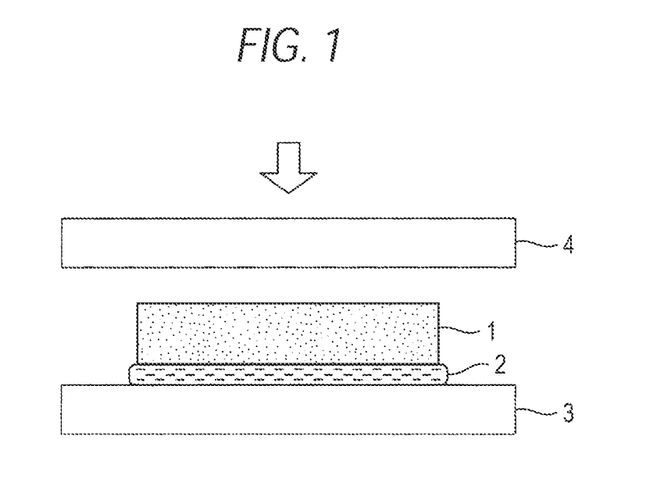
FIG. 1 is an explanatory drawing of the method for manufacturing a resin substrate or resin molded body according to the invention.

The following will explain modes for carrying out the present invention based on the drawings. FIG. 1 is an explanatory drawing of the method for manufacturing a resin substrate or resin molded body according to the invention. The method for manufacturing a resin substrate or resin molded body according to the invention is a method for manufacturing a fiber-reinforced resin substrate or resin molded body, the method comprising impregnating a reinforcing fiber material with a thermoplastic resin. For example, as shown in FIG. 1, a reinforcing fiber material 1 is first placed on a molten resin 2 obtained by melting the thermoplastic resin and pressurization is performed from an upper surface of the reinforcing fiber material 1 by an upper mold 4 to impregnate the reinforcing fiber material 1 with the molten resin 2. Then, a resin substrate or resin molded body impregnated with the thermoplastic resin and fiber-reinforced is manufactured by cooling and solidifying the impregnated reinforcing fiber material 1.

As the reinforcing fiber material 1, a reinforcing fiber bundle, a reinforcing fiber woven fabric, or the like can be used and the form and shape thereof are not particularly limited. Moreover, the reinforcing fiber material 1 can be formed by laminating the same kind or different kinds of materials. The material of the reinforcing fiber material 1 may include various fibers such as carbon fiber, ceramic fiber, and glass fiber and is not particularly limited. However, the invention can be suitably used for the reinforcing fiber material 1 composed of carbon fiber having such high thermal conductivity that, when a molten thermoplastic resin comes into contact therewith, the heat is rapidly taken to make the impregnation difficult.

The carbon fiber is generally processed into thread-like one (a strand, a reinforcing fiber bundle) in which 1000 pieces (1 k) or more, for example, 1 k to 24 k of single fibers having an outer diameter of 4 to 10 μm are bundled. Furthermore, the reinforcing fiber bundle is used as a warp and a weft to be processed into a reinforcing fiber woven fabric or is cut into a predetermined length to be processed into a chopped fiber or the like. In the invention, such a reinforcing fiber bundle, reinforcing fiber woven fabric, or chopped fiber of the carbon fiber or a mat-like fiber obtained by opening and laminating the fiber can be used as the reinforcing fiber material 1.

In the invention, the thermoplastic resin is not particularly limited. For example, various resins such as polyethylene resin, polypropylene resin, polyethylene terephthalate resin, polystyrene-based resins, polycarbonate-based resins or various grades of thermoplastic resins can be used.

Figure 2:
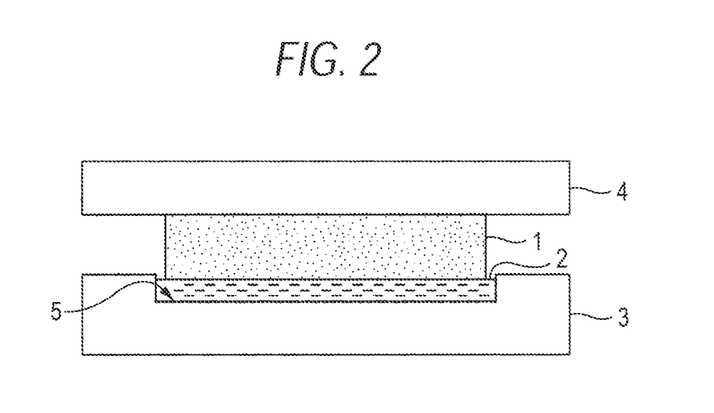
FIG. 2 is an explanatory drawing of an example of impregnation with applying resin pressure to a side portion of a reinforcing fiber material.

The molten resin 2 of the thermoplastic resin can be formed, as shown in FIG. 1, by a coated film obtained by applying a molten thermoplastic resin onto a lower mold 3. Moreover, the molten resin 2 can be formed by applying the molten thermoplastic resin to a molten bath 5 provided on the lower mold 3, as shown in FIG. 2. In the case where the molten resin 2 is formed by the coated film, the molten resin 2 having a thickness of 0.05 mm to 20 mm can be suitably formed. Incidentally, the molten resin 2 may have a thickness of 20 mm to 100 mm.

In the invention, the reinforcing fiber material 1 is first placed on such a molten resin 2. Since the molten resin 2 is viscous, the reinforcing fiber material 1 will stay in the same position on the molten resin 2 in general. Then, the reinforcing fiber material 1 is pressurized by the upper mold 4. The pressurization of the reinforcing fiber material 1 is preferably performed until the reinforcing fiber material 1 is completely impregnated with the molten resin 2. Pressurization force may be from 0.1 to 15 MPa. The pressurization force is generally from 1 to 10 MPa and is controlled to necessary pressure in consideration of elastic modulus of the reinforcing fiber material 1. Moreover, the area of pressurization, direction of pressurization, or pressurizing pattern (pressurizing rate, time, pressurization force, and temperature) on the reinforcing fiber material 1 can be changed depending on the reinforcing fiber material 1 and the thermoplastic resin used. Incidentally, the pressurization may be reduced or removed at some stage in the course of impregnating the reinforcing fiber material 1 with the molten resin 2 or at the stage of cooling and solidifying state after the impregnation.

In the pressurization of the reinforcing fiber material 1, the impregnation proceeds upward from the bottom portion of the reinforcing fiber material 1 with the molten resin that forms the molten resin 2 and the air remaining in the reinforcing fiber material 1 is replaced by the molten resin and discharged outside with the progress of the impregnation. The movement of the molten resin 2 in a horizontal direction is little. By such pressurization, the reinforcing fiber material 1 is homogeneously impregnated with the molten resin 2 and thus the air contained in the reinforcing fiber material 1 can be efficiently excluded.

In order to accelerate the impregnation of the reinforcing fiber material 1 with the molten resin and the discharge of the air, it is preferable to use the molten resin 2 formed in the molten bath 5 as shown in FIG. 2. During the pressurization of the reinforcing fiber material 1, resin pressure can be applied to a side portion of the reinforcing fiber material 1 and the impregnation of the reinforcing fiber material 1 with the molten resin and the discharge of the air are accelerated.

Moreover, the resin pressure can be applied to the side portion of the reinforcing fiber material 1 by the method shown in FIG. 3A and FIG. 3B. Namely, in the present example, a side frame 7 is provided on the upper mold 4 and the side frame 7 moves upward and downward along with the upper mold 4 at ordinary time (FIG. 3A). After a lower surface of the side frame 7 abuts on the lower mold 3, the molten bath 5 is formed by the side frame 7 and the lower mold 3 (FIG. 3B). Therefore, when the molten thermoplastic resin is applied on the lower mold 3 to form the molten resin 2 and the upper mold 4 is lowered to pressurize the reinforcing fiber material 1, the impregnation with the thermoplastic resin can be achieved while applying the resin pressure to the side portion of the reinforcing fiber material 1. Incidentally, unlike the mold shown in FIG. 3A and FIG. 3B, a mold structure having the side frame 7 on a lower mold side may be used.

Figure 4:
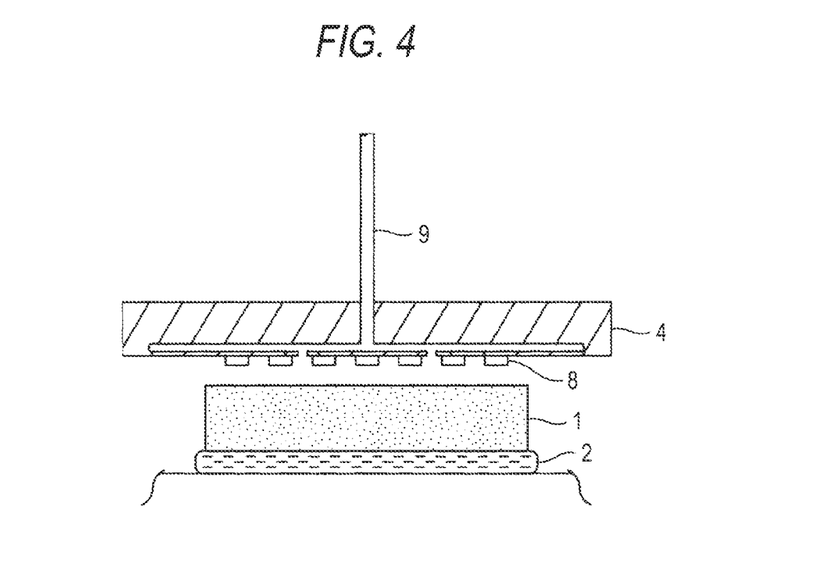
FIG. 4 is an explanatory drawing of a means for exhausting air to be discharged from a reinforcing fiber material, by a vacuum means.

The pressurization of the reinforcing fiber material 1 is preferably performed through a pressurizing body having a convex-concave portion or a groove for air vent. Thereby, the air remaining in the reinforcing fiber material 1 can be efficiently discharged. For example, as shown in FIG. 4, the reinforcing fiber material 1 can be pressurized through a convex portion 8 provided on the upper mold 4. In the present example, the convex portion 8 forms the pressurizing body. The pressurizing body may be formed from one in which a concave portion, groove, or the like is provided on the upper mold 4 or may be not integrated with the upper mold 4 and may be a separate one. Moreover, a wire netting can be used as the pressurizing body.

On the pressurizing body, a vacuum means communicating with the convex-concave portion or groove for air vent can be provided. For example, in the example shown in FIG. 4, a vacuum means 9 communicating with a space between the convex portions 8 is provided. By the vacuum means 9, the air discharged from the reinforcing fiber material 1 can be efficiently exhausted.

Figure 5:
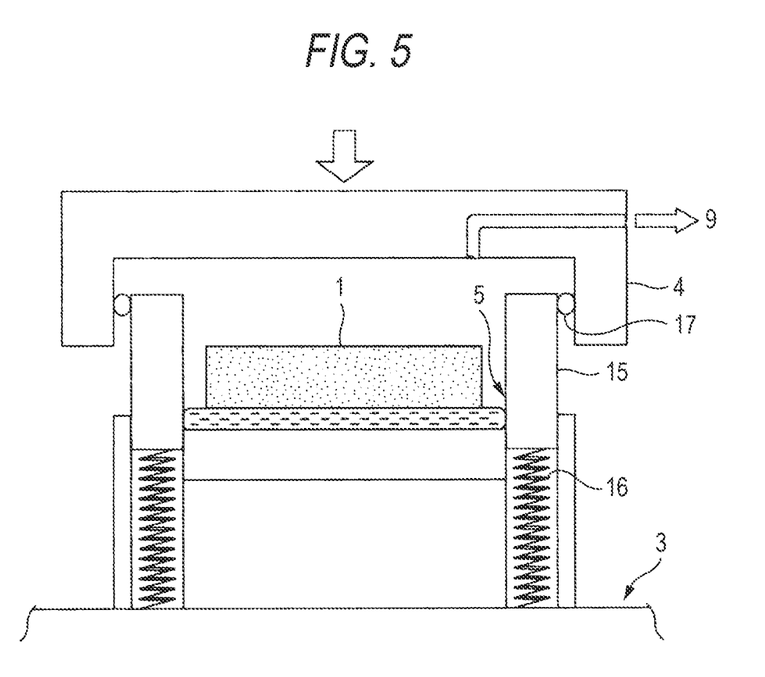
FIG. 5 is a schematic drawing of a mold having a vacuum means capable of applying resin pressure to a side portion of a reinforcing fiber material to achieve impregnation.

According to the mold having the vacuum means 9 shown in FIG. 5, impregnation can be performed while the air can be efficiently exhausted from the reinforcing fiber material 1 and also resin pressure is applied to the side portion of the reinforcing fiber material 1. In FIG. 5, the molten bath 5 is formed by the lower mold 3 and a slide mold 15 supported by a spring 16 and a vacuum space is formed by the upper mold 4, the lower mold 3, the slide mold 15, and a packing 17. By performing the impregnation with the molten resin 2 under pressurizing the reinforcing fiber material 1 with lowering the upper mold 4 while evacuation is performed by the vacuum means 9, a dense and high-quality resin substrate or resin molded body can be manufactured.

In the case where the molten resin 2 is formed by applying the molten thermoplastic resin, it is preferable to perform the formation by means of a plasticization and injection unit having a T-die. The T-die can suitably control the volume of the resin to be fed or the thickness of the resin to be fed onto an upper surface of the lower mold 3 and thus a required molded body 2 can be easily and rapidly formed. The plasticization and injection unit may be any one as long as it is a means capable of plasticizing and discharging the resin. For example, an extruder, an injection machine, a plunger machine, or the like can be used.

The temperature of the reinforcing fiber material 1 to be placed on the molten resin 2 formed by the T-die is preferably not over 100° C. higher or lower than the discharge temperature of the molten resin discharged from the discharge port of the T-die. By maintaining the reinforcing fiber material 1 to this range of temperature, the impregnation can be prevented from becoming difficult owing to a decrease in the temperature of the molten resin 2 even when the reinforcing fiber material 1 is such one having high thermal conductivity as carbon fiber. Since the viscosity of the thermoplastic resin logarithmically changes with respect to temperature, temperature control of the reinforcing fiber material 1 is important. For example, the temperature of the reinforcing fiber material 1 is preferably thermal deformation temperature of the thermoplastic resin or higher. Thereby, an increase in the viscosity of the thermoplastic resin that is in contact with the reinforcing fiber material 1 is suppressed and thus a decrease in impregnation performance of the thermoplastic resin can be suppressed.

In order to keep the temperature of the reinforcing fiber material 1 appropriately, it is preferable to provide a means for heating the reinforcing fiber material 1. The heating means is preferably one by far-infrared heating, one by induction heating, one by laser heating, or the like. Thereby, the reinforcing fiber material 1 can be efficiently heated. It is also possible to heat the reinforcing fiber material 1 to a predetermined temperature by a heating means provided on the upper and lower molds but the molds have large heat capacity and it is necessary to cool the reinforcing fiber material 1 impregnated with the resin, so that a heating means for heating the reinforcing fiber material 1 is preferably provided separately for achieving efficient cooling. Incidentally, the heating of the reinforcing fiber material 1 can be done before the reinforcing fiber material 1 is placed on the molten resin 2 or before the mold is closed and the pressurization is started after the material is placed. Moreover, the heating area of the reinforcing fiber material 1, the position on which the heating means is installed, and the like can be appropriately decided.

The reinforcing fiber material 1 impregnated with the molten resin 2 composed of the thermoplastic resin aforementioned, is cooled and solidified. Thus, the fiber-reinforced resin substrate or resin molded body is manufactured.

As above, according to the invention, the impregnation of the reinforcing fiber material with the thermoplastic resin and the discharge of the air remaining in the reinforcing fiber material can be effectively performed and a homogeneous and high-strength fiber-reinforced resin substrate or resin molded body can be manufactured. Incidentally, the resin molded body means one which is molded by the above-described method or the method to be explained below and is utilized as a molded body as it is. The resin substrate means one which is to be further formed and processed using the one as a material.

The invention is not limited to the above Examples. In the invention, according to the following method, a resin substrate or resin molded body having high fiber content can be manufactured. Namely, in the method, a molten resin already containing a reinforcing fiber is used. As shown in FIG. 6(a) and FIG. 6(b), a reinforcing fiber material 1 is placed on a molten resin 21 composed of a thermoplastic resin containing a reinforcing fiber, the reinforcing fiber material 1 is pressurized to impregnate the reinforcing fiber material 1 with the molten resin contained in the molten resin 21, and subsequently, the impregnated reinforcing fiber material 1 is cooled and solidified.

As the fiber to be contained in the molten resin 21, a short fiber having a length of 0.5 mm to 30 mm is used, for example, in the case of carbon fiber. As the molten resin 21 containing the carbon fiber, one having a carbon fiber volume content (Vf) of up to about 40% can be fed by the plasticization and injection unit. Since the reinforcing fiber material 1 is impregnated with the carbon fiber contained in the molten resin 21 together with the thermoplastic resin during the pressurization, according to the invention, a fiber-reinforced resin substrate or resin molded body formed by lamination of layers each having a high fiber content can be manufactured. In the invention, the fiber content of the layer having a high fiber content can be made as follows: Vf=30% to 60%, in the case of carbon fiber.

Moreover, in the invention, in the case of using the lower mold 3 shown in FIG. 6(a), a flat plate-like resin substrate or resin molded body can be manufactured. In the case of using the lower mold 31 as shown in FIG. 6(b), a resin substrate or resin molded body having a complicated shape, such as one having a shape with a rib, can be manufactured.

Furthermore, in the invention, the molten resin may be not necessarily one applied on the upper surface of the lower mold. For example, it may be one applied on a predetermined receiving component such as a resin-made or metal-made plate. The receiving component may be one that constitutes a part of a product integrally with the molded resin substrate or resin molded body.

EXAMPLES

Example 1

A molding test of a resin substrate was carried out using a mold shown in FIG. 6(a) and a plasticization and injection unit having a T-die. A reinforcing fiber material was one obtained by laminating 10 sheets of mats each having a length of 10 cm, a width of 15 cm, and a thickness of 0.2 cm. As the mat, there was used one obtained by lamination after carbon fiber was cut into a length of 15 mm and opened and dispersed. As a thermoplastic resin, a polyamide resin was used. After the temperature of upper and lower molds were heated to 280° C., the resin obtained by melting pellets containing 20 vol % of carbon fiber having a fiber length of 8 mm was melted at 280° C. and applied on the heated lower mold, and molding was performed with pressurization under the conditions of press pressurizing force of 6 MPa and press pressurizing time of 3 min. By the above molding test, a good resin molded body having a resin molded body thickness of 1.6 mm, a carbon fiber volume content of 38%, a bending strength of 480 MPa, and a bending elastic modulus of 29 GPa, in which the carbon fiber was impregnated with the resin, was obtained.

Example 2

Figure 3:
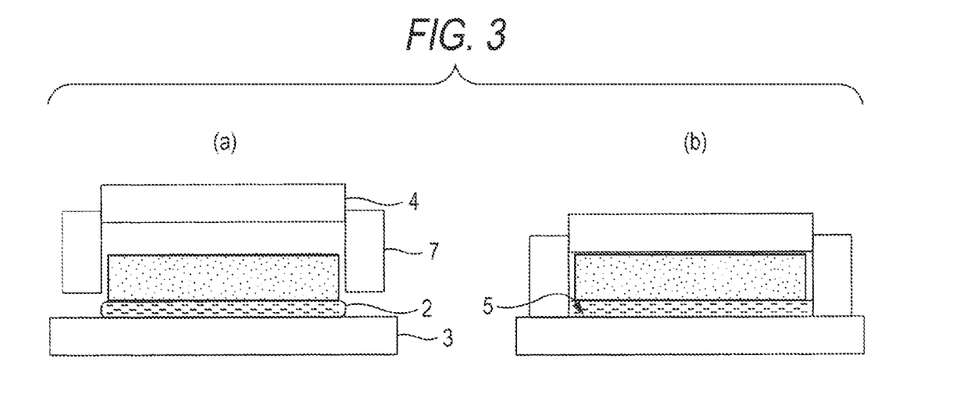
FIG. 3 is an explanatory drawing of another example of applying resin pressure to a side portion of a reinforcing fiber material to achieve impregnation.

A molding test of a resin substrate was carried out using a mold shown in FIG. 3 and a plasticization and injection unit having a T-die. A reinforcing fiber material was one obtained by laminating 15 sheets of mats each having a length of 10 cm, a width of 15 cm, and a thickness of 0.2 cm. As the mat, there was used one obtained by lamination after carbon fiber was cut into a length of 15 mm and opened and dispersed. As a thermoplastic resin, a polyamide resin was used. After the temperature of upper and lower molds were heated to 280° C., the resin was melted at 280° C. and applied on the heated lower mold, and molding was performed with pressurization under the conditions of press pressurizing force of 6 MPa and press pressurizing time of 3 min. By the above molding test, a good resin molded body having a resin molded body thickness of 1.6 mm, a carbon fiber volume content of 48%, a bending strength of 540 MPa, and a bending elastic modulus of 33 GPa, in which the carbon fiber was impregnated with the resin, was obtained.

Example 3

Figure 6:
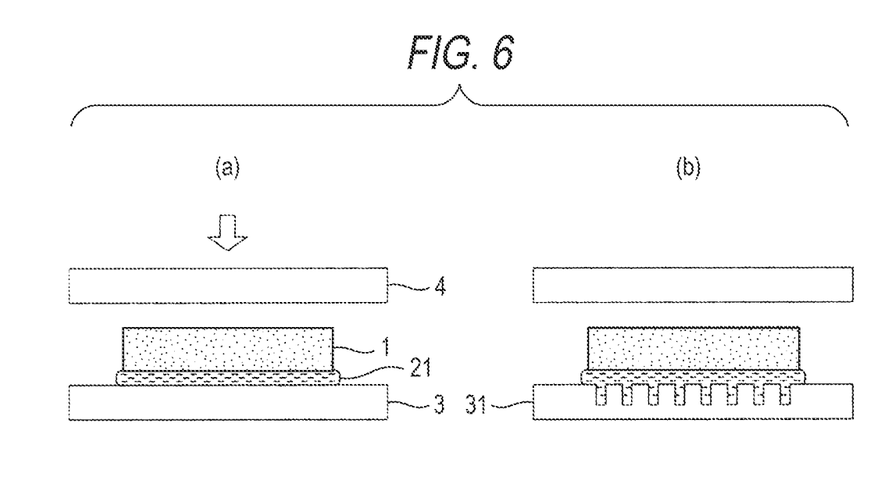
FIG. 6(a) and FIG. 6(b) are explanatory drawings of a method for manufacturing a resin substrate or resin molded body in which layers having high fiber content are laminated.

A molding test of a resin substrate was carried out using a mold shown in FIG. 6 (b) and a plasticization and injection unit having a T-die. A reinforcing fiber material was one obtained by laminating 10 sheets of mats each having a length of 10 cm, a width of 15 cm, and a thickness of 0.2 cm. As the mat, there was used one obtained by lamination after carbon fiber was cut into a length of 15 mm and opened and dispersed. As a thermoplastic resin, a polyamide resin was used. After the temperature of upper and lower molds were heated to 280° C., the resin obtained by melting pellets containing 20 vol % of carbon fiber having a fiber length of 8 mm was melted at 280° C. and applied on the heated lower mold, and molding was performed with pressurization under the conditions of press pressurizing force of 6 MPa and press pressurizing time of 3 min. By the above molding test, a good resin molded body having a carbon fiber volume content of 50% on average at the mat portion and a carbon fiber content of 30% on average at the applied portion, in which the carbon fiber was impregnated with the resin, was obtained.

The properties of the resin molded bodies obtained by the molding tests in the above Examples 1 to 3 are listed in Table 1. The bending test was performed in accordance with JIS K7074.

TABLE 1

| | Molded article thickness [mm] | Carbon fiber volume content [%] | Bending strength [MPa] | Bending elastic modulus [GPa] |
|---|---|---|---|---|
| Example 1 | 1.6 | 38 | 480 | 29 |
| Example 2 | 2.1 | 48 | 540 | 33 |
| Example 3 | 1.6 | 50% on average at upper portion, 30% on average at lower portion | — | — |

While the invention has been described in detail and with reference to specific embodiments thereof, it will be apparent to one skilled in the art that various changes and modifications can be made therein without departing from the spirit and scope thereof. The present application is based on Japanese Patent Application No. 2013-008834 filed on Jan. 21, 2013, and the contents are incorporated herein by reference.

REFERENCE SIGNS LIST

1: Reinforcing fiber material
2: Molten resin
3: Lower mold
4: Upper mold
5: Molten bath
7: Side frame
8: Convex portion
9: Vacuum means
15: Slide mold
16: Spring
17: Packing
21: Molten resin
31: Lower mold

The invention claimed is:

1. A method for manufacturing a fiber-reinforced resin substrate or resin molded body obtained by impregnating a reinforcing fiber material with a thermoplastic resin, comprising in the following order:
   forming a molten resin of the thermoplastic resin onto a lower mold;
   placing the reinforcing fiber material on the molten resin of the thermoplastic resin;
   pressurizing the reinforcing fiber material with a pressurization force of from 0.1 to 15 MPa by an upper mold to impregnate the reinforcing fiber material with the molten thermoplastic resin; and subsequently
   cooling and solidifying the reinforcing fiber material impregnated with the molten thermoplastic resin,
   wherein in the pressurization of the reinforcing fiber material, the impregnation proceeds upward from the bottom portion of the reinforcing fiber material with the molten resin and the air remaining in the reinforcing fiber material is replaced by the molten resin and discharged outside with the progress of the impregnation, and
   the movement of the molten resin in a horizontal direction is little.

2. The method for manufacturing a fiber-reinforced resin substrate or resin molded body according to claim 1, wherein the molten resin of the thermoplastic resin is a coated film.

3. The method for manufacturing a fiber-reinforced resin substrate or resin molded body according to claim 1, wherein at the time of the pressurizing the reinforcing fiber material placed on the molten resin of the thermoplastic resin, the pressurization is performed so that resin pressure is applied to a side portion of the reinforcing fiber material.

4. The method for manufacturing a fiber-reinforced resin substrate or resin molded body according to claim 1, wherein the pressurizing the reinforcing fiber material is performed through a pressurizing body on which a convex-concave portion for air vent or a groove for air vent has been provided.

5. The method for manufacturing a fiber-reinforced resin substrate or resin molded body according to claim 4, wherein the pressurizing body is provided to the upper mold.

6. The method for manufacturing a fiber-reinforced resin substrate or resin molded body according to claim 1, wherein the reinforcing fiber material is formed by laminating the same kind or different kinds of materials.

7. The method for manufacturing a fiber-reinforced resin substrate or resin molded body according to claim 1, wherein the reinforcing fiber material is formed of carbon fiber.

8. The method for manufacturing a fiber-reinforced resin substrate or resin molded body according to claim 1, wherein the molten resin is formed on the lower mold by melting the resin on the lower mold, or by applying a molten resin on the lower mold, or by introducing a molten resin on the lower mold.

9. The method for manufacturing a fiber-reinforced resin substrate or resin molded body according to claim 1, wherein the molten resin is formed on the lower mold in a state where the entire bottom surface of the molten resin is in contact with the lower mold.

10. The method for manufacturing a fiber-reinforced resin substrate or resin molded body according to claim 1, wherein the reinforcing fiber material is maintained at a temperature of a thermal deformation temperature of the thermoplastic resin or higher.

11. A method for manufacturing a fiber-reinforced resin substrate or resin molded body formed by lamination of layers each having a high fiber content, comprising in the following order:
   forming a molten resin of the thermoplastic resin onto a lower mold;
   placing a reinforcing fiber material on the molten resin obtained from a thermoplastic resin containing a reinforcing fiber;

pressurizing the reinforcing fiber material with a pressurization force of from 0.1 to 15 MPa by an upper mold to impregnate the reinforcing fiber material with the molten thermoplastic resin; and subsequently cooling and solidifying the reinforcing fiber material impregnated with the molten thermoplastic resin, wherein in the pressurization of the reinforcing fiber material, the impregnation proceeds upward from the bottom portion of the reinforcing fiber material with the molten resin and the air remaining in the reinforcing fiber material is replaced by the molten resin and discharged outside with the progress of the impregnation, and the movement of the molten resin in a horizontal direction is little.

12. The method for manufacturing a fiber-reinforced resin substrate or resin molded body formed by lamination of layers each having a high fiber content according to claim 11, wherein the molten resin is formed on the lower mold by melting the resin on the lower mold, or by applying a molten resin on the lower mold, or by introducing a molten resin on the lower mold.

13. The method for manufacturing a fiber-reinforced resin substrate or resin molded body formed by lamination of layers each having a high fiber content according to claim 11, wherein a carbon fiber content of the layer having a high fiber content is 30% to 60%.

14. The method for manufacturing a fiber-reinforced resin substrate or resin molded body formed by lamination of layers each having a high fiber content according to claim 11, wherein the molten resin is formed on the lower mold in a state where the entire bottom surface of the molten resin is in contact with the lower mold.

15. The method for manufacturing a fiber-reinforced resin substrate or resin molded body formed by lamination of layers each having a high fiber content according to claim 11, wherein the reinforcing fiber material is maintained at a temperature of a thermal deformation temperature of the thermoplastic resin or higher.

* * * * *